United States Patent
Alvarez et al.

(10) Patent No.: US 11,021,799 B2
(45) Date of Patent: Jun. 1, 2021

(54) ELECTRODE-SUPPORTED TUBULAR SOLID-OXIDE ELECTROCHEMICAL CELL

(71) Applicant: Low Emissions Resources Corporation, New York, NY (US)

(72) Inventors: Fernando Alvarez, Huntington, NY (US); Lauren Beverly Sammes, Aurora, CO (US)

(73) Assignee: Low Emission Resources Corporation, Huntington, NY (US)

( * ) Notice: Subject to any disclaimer, the term of this patent is extended or adjusted under 35 U.S.C. 154(b) by 154 days.

(21) Appl. No.: 16/574,570

(22) Filed: Sep. 18, 2019

(65) Prior Publication Data
US 2020/0040469 A1    Feb. 6, 2020

Related U.S. Application Data

(63) Continuation of application No. 14/878,544, filed on Oct. 8, 2015, now Pat. No. 10,458,027.

(51) Int. Cl.
| | |
|---|---|
| C25D 17/00 | (2006.01) |
| C25D 1/00 | (2006.01) |
| C25B 11/02 | (2021.01) |
| H01M 4/88 | (2006.01) |
| H01M 8/124 | (2016.01) |
| H01M 8/1213 | (2016.01) |
| C25B 9/19 | (2021.01) |
| C25B 11/031 | (2021.01) |
| C25B 13/02 | (2006.01) |
| C25B 13/04 | (2021.01) |
| H01M 4/90 | (2006.01) |

(52) U.S. Cl.
CPC ............... *C25B 11/02* (2013.01); *C25B 9/19* (2021.01); *C25B 11/031* (2021.01); *C25B 13/02* (2013.01); *C25B 13/04* (2013.01); *H01M 4/8864* (2013.01); *H01M 4/8885* (2013.01); *H01M 8/124* (2013.01); *H01M 8/1213* (2013.01); *H01M 4/9025* (2013.01); *H01M 2300/0074* (2013.01); *Y02P 70/50* (2015.11)

(58) Field of Classification Search
CPC .... C25B 1/00; C25B 9/06; C25B 9/08; C25B 11/035; C25B 13/04; C25B 9/10; C25B 11/04
See application file for complete search history.

(56) References Cited

U.S. PATENT DOCUMENTS

| | | | | |
|---|---|---|---|---|
| 6,420,064 B1 * | 7/2002 | Ghosh | ................. | H01M 8/1213 429/489 |
| 2002/0028367 A1 * | 3/2002 | Sammes | ............. | H01M 4/8864 429/489 |

OTHER PUBLICATIONS

"Souza; Properties and Applications of Perovskite Proton Conductors; 2010; Materials Research; pp. 385-394".*

* cited by examiner

*Primary Examiner* — Zulmariam Mendez
(74) *Attorney, Agent, or Firm* — Vorys, Sater, Seymour and Pease LLP

(57) ABSTRACT

Electrode-supported tubular solid-oxide electrochemical cells suitable for use in electrochemical synthesis and processes for manufacturing such are provided.

14 Claims, 2 Drawing Sheets

ELECTRODE-SUPPORTED TUBULAR SOLID-OXIDE ELECTROCHEMICAL CELL

CROSS-REFERENCE TO RELATED APPLICATIONS

The present application is a continuation of U.S. patent application Ser. No. 14/878,544, filed on Oct. 8, 2015 and incorporated herein by reference in its entirety.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright Low Emission Resources Corporation, 2015, All Rights Reserved.

TECHNICAL FIELD

The present disclosure relates to solid state electrochemical cells, more particularly to electrode-supported tubular solid-oxide electrochemical cells for use in electrochemical synthesis of chemicals and methods of making such electrode-supported tubular solid-oxide electrochemical cells.

BACKGROUND

Electrochemical cells that incorporate ion conducting solid electrolytes have shown great promise for gaseous chemical synthesis applications. Electrochemical synthesis using such ion conducting solid electrolytes can produce high purity gases at higher reaction rates, with lower cost and without several of the chemical by-products and detrimental environmental impacts of traditional catalytic chemical synthesis processes.

For example, the traditional catalytic production of hydrogen gas ($H_2$) and of ammonia ($NH_3$), and the steps involved in their commercial scale implementation, are very energy intensive processes and produce massive amounts of carbon dioxide ($CO_2$), a greenhouse gas widely acknowledged by the global scientific community as contributing to the warming of the earth's atmosphere and oceans.

Hydrogen gas ($H_2$) is an important starting material for many industrial chemicals and also important as a primary fuel source in renewable energy production. Currently, most industrial hydrogen gas production involves catalytic steam reforming of a carbonaceous feed, such as natural gas, coal, liquefied petroleum gas, or the like, as follows:

This process typically requires high temperatures (such as 700-1000° C.) and, in practice, involves various additional steps, such as removing sulfur from the carbonaceous feed.

Ammonia ($NH_3$) is one of the most highly produced inorganic chemicals in the world because of its many commercial uses, such as in fertilizers, explosives and polymers. Modern commercial production of ammonia typically utilizes some variation of the Haber-Bosch process. The Haber-Bosch process involves the reaction of gaseous nitrogen ($N_2$) and hydrogen ($H_2$) on an iron-based catalyst at high pressures (such as 150-300 bar) and high temperature (such as 400-500° C.), as follows:

In modern ammonia-producing plants, the nitrogen feed typically derives from atmospheric air but the hydrogen feed typically derives from catalytic steam reforming of a carbonaceous feed stock, discussed above. In practice, implementation of this process requires various other steps, such as separating and purifying the hydrogen before it can be used.

Commercial scale production of industrially important chemicals, such as hydrogen and ammonia, may be achieved more efficiently and cost effectively by electrochemical synthesis than by the traditional catalytic processes such as those discussed above. For example, hydrogen gas can be produced by direct electrolysis of steam ($H_2O$) without requiring a carbonaceous feed source and the commensurate production of carbon dioxide. Ammonia may be electrochemically produced by directly reacting the hydrogen with nitrogen, eliminating the need for intermediate steps to separate and purify the hydrogen before use in the synthesis reaction.

Electrochemical synthesis is typically carried out using an electrochemical cell that incorporate two electrodes (an anode and a cathode) and an electrolyte that separates the two electrodes. As used in electrochemical synthesis applications, the two electrodes are connected via electronic circuitry to a power source, and the electrolyte typically is a material that conducts ionic species but not electrons nor non-ionized species, such as the initial chemical reactants and final chemical products. When a voltage is applied across the two electrodes, a reactant is dissociated and ionized at one electrode, and the ionized reactant species migrates through the electrolyte toward the opposite electrode, where it reacts (in some cases with a second reactant that is present at the opposite electrode) to form the desired reaction product. The materials and configuration of the electrodes and electrolyte are selected and optimized depending on the desired electrochemical synthesis reaction.

For electrochemical synthesis to be widely applicable and commercially viable, there exists a need for electrochemical cells that may be fabricated using a variety of materials and in various configurations, depending on the desired electrochemical synthesis reaction, in a cost-effective and scalable way. Moreover, it is desirable for the electrochemical cells to have the structural and chemical stability and durability to withstand the potentially severe temperatures, pressures and chemical environments in which they would operate.

SUMMARY

In one aspect, the present disclosure provides a tubular solid-oxide electrochemical cell that includes a first porous electrode configured in a tubular shape, an electrolyte disposed as a thin-layer on at least part of a surface of the first porous electrode, and a second porous electrode disposed on at least a part of a surface of the electrolyte. The first porous electrode includes a first mixed ionically/electronically conductive composite material of a solid-oxide electrolyte substance and a first electrochemically active metallic substance. The electrolyte includes the solid-oxide electrolyte substance. The second porous electrode includes a second mixed ionically/electronically conductive composite material of the same solid-oxide electrolyte substance and a second electrochemically active metallic substance.

In another aspect, the present disclosure provides a tubular solid-oxide electrochemical cell made by extruding an electrode dough in a tubular shape to form a first electrode, wherein the electrode dough includes a solid-oxide electrolyte substance, a first electrochemically active metallic substance, a carbon-based pore forming substance, a binder and a solvent; sintering the extruded first electrode to cause the carbon-based pore forming substance to burn off and form pores in the first electrode; forming an electrolyte onto at least part of a surface of the sintered first electrode, wherein the electrolyte is a thin-layer of the solid-oxide electrolyte substance; and forming a second electrode onto at least part of a surface of the electrolyte, wherein the second electrode includes the solid-oxide electrolyte material and a second electrochemically active metallic substance.

In still another aspect, the present disclosure provides a process for manufacturing a tubular solid-oxide electrochemical cell, including the steps of forming an electrode dough that includes a solid-oxide electrolyte substance, a first electrochemically active metallic substance, a first carbon-based pore forming substance, a first binder and a first solvent; extruding the electrode dough in a tubular shape to form a first electrode; and sintering the extruded first electrode. An electrolyte slurry including the solid-oxide electrolyte substance and a second solvent is formed and coated onto at least a part of a surface of the sintered first electrode, and the electrolyte coating sintered. An electrode slurry including the solid-oxide electrolyte substance, a second electrochemically active metallic substance, a second carbon-based pore forming substance and a third solvent is formed and coated onto at least a part of a surface of the sintered electrolyte, and the electrode coating is sintered.

BRIEF DESCRIPTION OF THE DRAWINGS

For a better understanding of the nature, objects, and processes involved in this disclosure, reference should be made to the detailed description taken in conjunction with the accompanying drawings, in which.

DETAILED DESCRIPTION

The present disclosure provides for cost-effective production of electrochemical cells for use in electrochemical synthesis that may be customized and optimized depending on the desired electrochemical synthesis reaction. The electrochemical cells of the present disclosure have a tubular configuration and are made of solid-oxide ceramic materials. Tubular solid-oxide electrochemical cells according to the present disclosure may be stacked and arranged in various configurations, and have the mechanical and chemical stability and durability to be used in commercial scale electrochemical synthesis of various gases, such as hydrogen, ammonia, nitric oxide, syngas, and others.

Figure 1A:
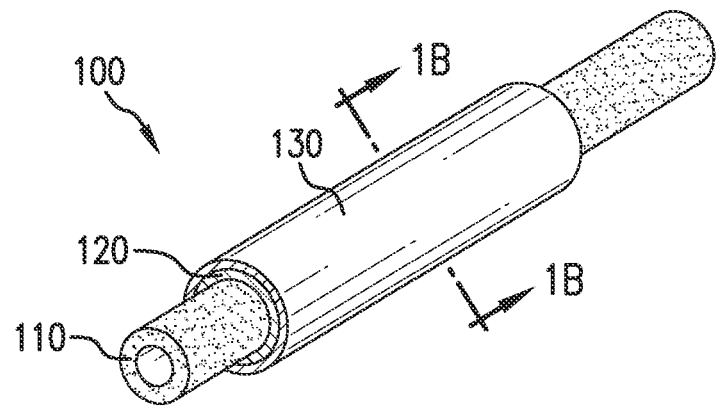
FIGS. 1A, 1B and 1C depict a tubular solid-oxide electrochemical cell according to one embodiment of the present disclosure.

FIG. 1A shows an isometric view of one embodiment of a tubular solid-oxide electrochemical cell 100 according to the present disclosure. The electrochemical cell 100 is supported by a first electrode 110 configured in a tubular shape, upon which an electrolyte 120 and a second electrode 130 are disposed. As shown in FIG. 1A, the electrolyte 120 is disposed as a thin-layer on at least a portion of a surface of the first electrode 110, and the second electrode 130 disposed on at least a portion of a surface of the electrolyte 120.

Figure 1B:
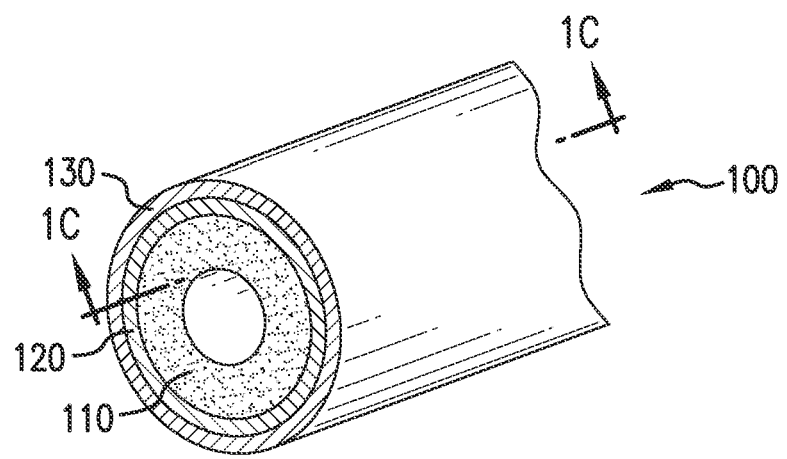
Figure 1C:
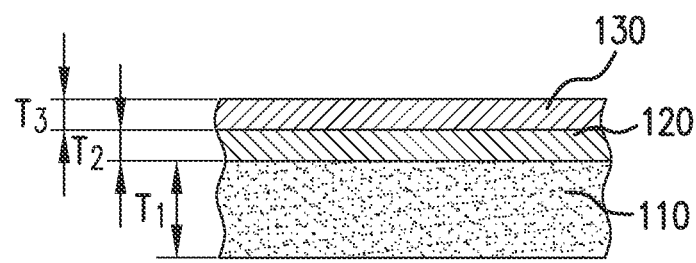

FIG. 1B shows a cross-sectional isometric view through the midsection, and FIG. 1C shows an axial cross-sectional view through part of the midsection, of the tubular solid-oxide electrochemical cell 100 shown in FIG. 1A. The first electrode 110 has an average thickness ($T_1$) that is greater than the combined average thickness ($T_2$) of the thin-layer of the electrolyte 120 and the average thickness ($T_3$) of the second electrode 130 taken together. The relatively thick first electrode provides mechanical support for the electrochemical cell and allows the electrolyte to be thinner, which helps reduce both ohmic losses and the amount of energy needed to transport ions through the electrolyte. Typically, the average thickness of the first (support) electrode ($T_1$) is in a range of about 5 mm to about 50 mm, the average thickness of the electrolyte ($T_2$) is in a range of about 5 microns to about 100 microns, and the average thickness of the second electrode is ($T_3$) is in a range of about 5 microns to about 100 microns.

While FIGS. 1A-1C show an embodiment having the electrolyte 120 being disposed on an outer surface of the first (support) electrode 110, and the second electrode 130 being disposed on an outer surface of the electrolyte 120, the present disclosure includes embodiments where the electrolyte and second electrode are formed on at least a portion of an inner surface of the first electrode and the electrolyte, respectively, so that the first (support) electrode is the outermost layer of the electrochemical cell.

Moreover, depending on the desired electrochemical synthesis reaction, the selection of the electrolyte and the configuration of the reaction apparatus, the first (support) electrode may function as the anode and the second electrode as the cathode, or vice versa (i.e., the first (support) electrode may function as the cathode and the second electrode as the anode).

The electrolyte used in the present electrochemical cells typically is made of a solid-oxide electrolyte substance, such as a perovskite, a fluorite, and others known in the art. The solid-oxide electrolyte substance preferably is designed to have high ionic conductivity, low electronic conductivity, and high density so as to prevent non-ionized gaseous reactants from mixing.

Perovskite commonly refers to a class of metal oxide materials having a general formula $ABO_3$, where A refers to a metal cation having a relatively large ionic radius and B refers to a metal cation having a relatively small ionic radius. The crystal structure of perovskite materials is highly tolerant to vacancy formation and encompasses various different phases (such as Aurivilius phase and Ruddleson Popper phase), making perovskite materials well suited for use as ion conducting electrolytes. "A" may include, but is not limited to, monovalent metal cations ($M^{1+}$, such as Na, K), divalent metal cations ($M^{2+}$, such as Ca, Sr, Ba, Pb), trivalent metal cations ($M^{3+}$, such as Fe, La, Gd, Y) and combinations thereof "B" may include, but is not limited to, pentavalent metal cations ($M^{5+}$, such as Nb, W), tetravalent metal cations ($M^{4+}$, such as Ce, Zr, Ti), trivalent metal cations ($M^{3+}$, such as Mn, Fe, Co, Ga, Al) and combinations thereof.

Fluorite commonly refers to a class of materials having a face-centered cubic structure and includes metal oxides having a general formula $MO_2$, where "M" may include, but is not limited to, divalent metal cations ($M^{2+}$, such as Ca, Sr, Ba, Mg), trivalent metal cations ($M^{3+}$, such as Sc, Y, Yb, Er, Tm, La, Gd, Dy, Sm, Al, Ga, In), tetravalent metal cations ($M^{4+}$, such as Ce, Zr, Th, Hf, Bi) and combinations thereof.

Other metal oxide materials that may be used for the solid-oxide electrolyte substance according to the present disclosure include pyrochlores (having a general formula $A_2B_2O_7$ or $A_{2-x}A'_xB_2O_6$, where A is a trivalent metal cation such as Gd, Sm, La, Nd, Eu, Tb, Bi, Y, Dy; A' is a divalent metal cation such as Ca; and B is a tetravalent metal cation such as Ti, Zr, Ru), brownmillerite ($A_2B_2O_5$, where A is a divalent cation such as Al, Ca, Sr, Ba; and B is a trivalent metal cation such as Fe, In, Ga, Mn, Cr, Zr, I-If, Ce, Ti) and the like.

Depending on the desired electrochemical synthesis reaction, the solid-oxide electrolyte substance is selected to be a proton ($H^+$) conducting material, or an oxygen ion ($O^{2-}$) conducting material. The specific composition of the solid-oxide electrolyte substance and whether it acts as a proton conductor or an oxygen ion conductor will also depend on the desired electrochemical synthesis reaction, as the combination of metal ions (e.g., A, A', B, or M) may be manipulated to minimize the chemical reactivity of the electrolyte to the reactants and reaction conditions as well as optimize the conductivity of the desired ionic reactant species.

The first and second electrodes used in the present electrochemical cells typically are made of a mixed ionically/electronically conductive composite material of the solid-oxide electrolyte substance and an electrochemically active substance. Moreover, the first and second electrodes preferably are porous and chemically stable in the highly reducing or oxidizing environment in which the electrochemical cells operate. In some embodiments, the first and second electrodes are made of the same mixed ionically/electronically conductive composite material; in other embodiments, the first electrode is made of a first mixed ionically/electronically conductive composite material and the second electrode is made of a second mixed ionically/electronically conductive composite materials that is different from the first mixed ionically/electronically conductive composite material.

In prior art electrochemical cells, the electrolyte and the electrodes typically have different thermal characteristics so that, upon heating, the electrolyte and the electrodes expand at different rates causing one or more of the electrodes to crack and/or split away from the electrolyte. It has been found that, when the electrodes of the present electrochemical cells are made of a composite material that incorporates the same solid-oxide electrolyte substance used in the electrolyte, it is possible to match the coefficients of thermal expansion (CTEs) of the electrodes' materials sufficiently with the CTE of the electrolyte's materials so as to prevent the cracking and/or splitting observed upon heating of prior art electrochemical cells. The mixed ionically/electronically conductive composite materials used for the electrodes typically have at least about 70% by weight of the solid-oxide electrolyte substance and preferably have a coefficient of thermal expansion within about ±10% of that of the solid-oxide electrolyte sub stance.

When the present electrochemical cells are used for electrochemical synthesis reactions, the electrodes provide the reaction sites for the oxidation and reduction half-reactions that make up the desired electrochemical synthesis reaction. Accordingly, the first and second electrodes incorporate an electrochemically active substance, such as metal or metal oxide or semiconductor substance, that helps catalyze the desired half-reactions and also provides electronic conductivity to the electrodes. The electrochemically active substance used will depend on the desired electrochemical synthesis reaction, and may include, but is not limited to, Sc, Ti, Zn, Sr, Y, Zr, Au, Bi, Pb, Co, Pt, Ru, Pd, Ni, Cu, Ag, W, Os, Rh, Ir, Cr, Fe, Mo, V, Re, Mn, Nb, Ta, and oxides, alloys and mixtures thereof.

Additionally, the electrodes preferably have a porosity and microstructure that allow the reactant gases to migrate throughout the electrode to come into contact with the electrochemically active metallic substance, and dissociate and/or react according to the desired electrochemical synthesis reaction. The porosity and microstructure of the electrodes are provided by incorporating a carbon-based pore forming substance which is burned out from the mixed ionically/electronically conductive composite material during the formation of the electrodes, as will be discussed further below. The carbon-based pore-forming substance may include, but is not limited to, graphite powder, starch, powdered and/or particulate organic polymers (e.g., polymethylmethacrylate, acrylic resin, polyvinylchloride, and the like). The amount and type of carbon-based pore forming material may be adjusted to create an optimal porous microstructure for the electrodes, depending on the desired electrochemical synthesis reaction.

Figure 2:
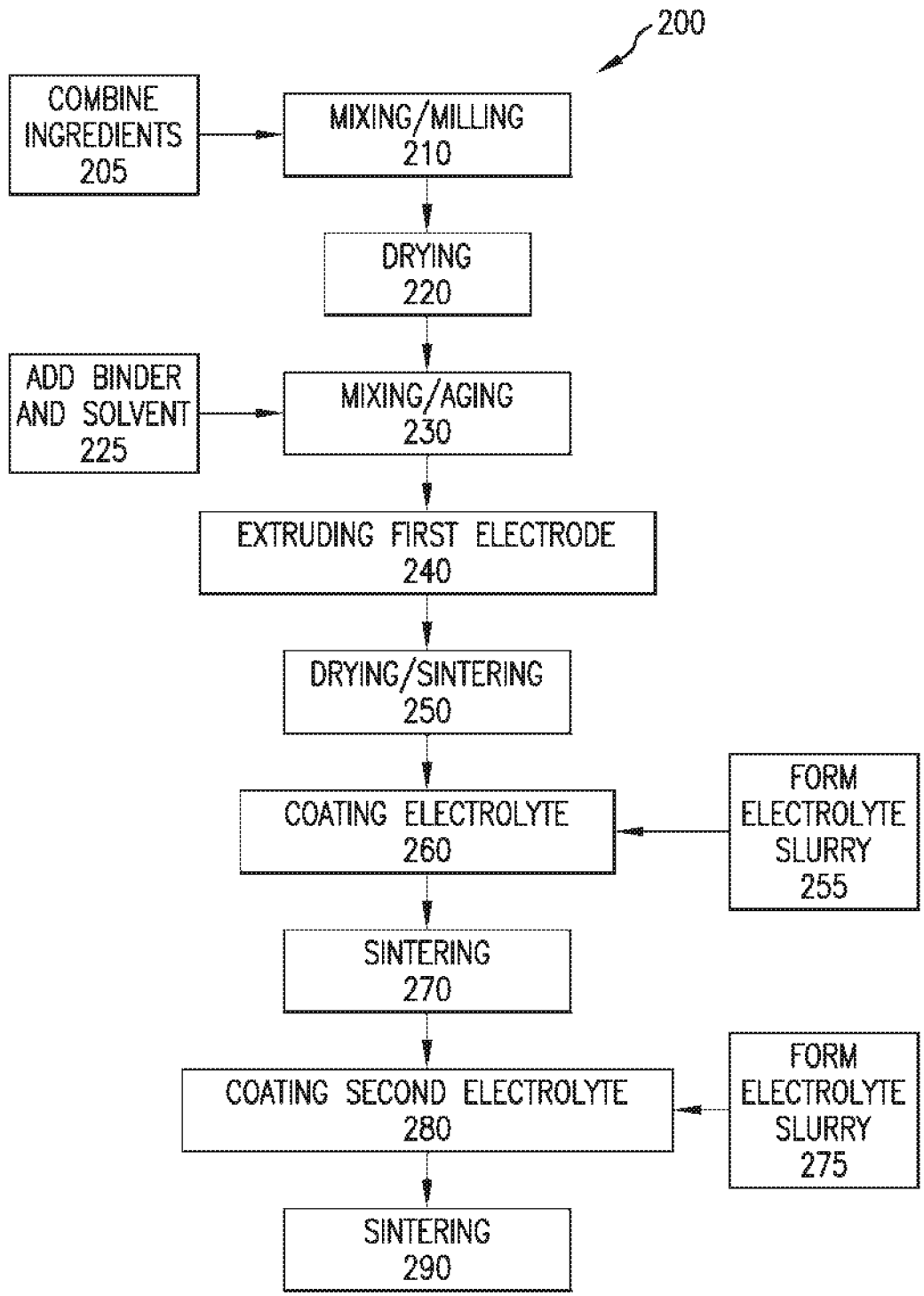
FIG. 2 shows a flow chart illustrating one embodiment of a process for manufacturing a tubular solid-oxide electrochemical cell according to the present disclosure.

FIG. 2 shows a flow chart 200 outlining one embodiment of a process for manufacturing a tubular solid-oxide electrochemical cell according to the present disclosure. In general, the first electrode is formed in a tubular shape by extruding an electrode dough, and the extruded first electrode is sintered before an electrolyte is coated onto at least a portion of a surface of the first electrode. After the electrolyte coated first electrode is sintered, a second electrode is coated onto at least a portion of a surface of the electrolyte, and the completed electrochemical cell is heated to sinter the second electrode. The steps involved in this embodiment will be discussed in more detail below.

The ingredients for the first electrode are combined at 205 and mixed and milled at 210, typically using a solvent in order to adjust the particle size and particle size distribution of the ingredients. Any solvent known and used in the art for milling, such as water, may be used. The ingredients for the first electrode include at least a solid-oxide electrolyte substance, a first electrochemically active substance, and a carbon-based pore-forming substance. One or more of the other additives discussed below may also be combined, mixed and milled with these ingredients. After milling to an appropriate particle size and distribution, the mixture of ingredients is dried at 220.

A binder and solvent are added at 225 to the mixture of ingredients and the resulting combination mixed and aged at 230 to form an electrode dough. The binder may be any known aqueous or non-aqueous binder, such as polyvinyl pyrollidone, polyvinyl alcohol, polyvinyl butyral, an acrylic (such as a polymethacrylate, and the like), a polyacrylamide, a polyethylene oxide, an alginate, a cellulose (such as methylcellulose, ethylcellulose, and the like), a starch, a gum, a styrene or a binder system, such as the Duramax™ binders (available from The Dow Chemical Company), as well as combinations and mixtures thereof. The solvent may be any solvent used in ceramic manufacturing, such as water, acetone, ethanol, isopropanol, methyethyl ketone, α-terpineol, and the like, as well as combinations and mixtures thereof. The selection of binder will depend on the other electrode ingredients and the solvent, as the binder typically imparts wet and dry strength to the electrode dough and the resulting electrode and must be compatible with the solvent.

One or more other additives that are known and used in ceramics manufacturing also may be added at 225 (if not added previously) to impart a consistency and other properties that allow the electrode dough to be smoothly extruded. Such additives may include: a dispersant, such as polyacrylic acid, a phosphoric ester of an alcohol or phenol (e.g., available under the Beycostat™ mark), and the like; a polymer or polymerization system, such as acrylamide with a cross linker (e.g., bis-acrylamide), an initiator (e.g., ammonium persulfate), and a catalyst (e.g., tetramethylethylenediamine); a plasticizer, such as dioctylphthalate and the like; a viscosity modifier; a flocculent; and a lubricant. The electrode dough typically has about 30% to about 70% volume of solid ingredients, with the remaining volume being solvent.

After aging, the electrode dough is extruded through a die at 240 to form a first electrode in a tubular shape. Any known extrusion method may be used. The tubular first electrode may be made to any length and diameter, though typically is from about 5 cm to about 150 cm in length with an inner dimension from about 0.5 cm to about 5 cm. The extruded tubular first electrode generally has a circular cross-section, but other cross-sectional shapes (such as semicircular, oval, square, rectangular, triangular, trapezoidal, star, etc.) are possible and within the scope of this present disclosure. For some implementations, depending on the particular synthesis reaction and reactor configuration, a non-circular cross-section may provide certain advantages, such as cell packing, heat dissipation and/or reactant flow through or along or around the cell.

The extruded tubular first electrode is dried and sintered at 250. During drying and sintering, the extruded tubular first electrode is typically placed horizontally onto a holder that will prevent the first electrode from bending. The extruded tubular first electrode may be dried at room temperature for up to 48 hours, and then sintered to burn off the additives from the extruded tubular electrode. Sintering may involve gradually heating the extruded tubular electrode, for example, at a rate between about 0.1° C./minute to about 10° C./minute, though more typically between about 1° C./minute to about 2° C./minute, to a set temperature between about 800° C. to about 1600° C. and holding at the set temperature for up to about 12 hours. In some embodiments, sintering may involve gradually heating in a stepwise manner to one or more intermediate set temperatures and holding at each intermediate set temperature in order to burn off various different additives. As the extruded tubular electrode is sintered and the carbon-based pore forming substance, in particular, burns off, pores are left behind in the electrode, so that the sintered first electrode is a solid porous cermet (ceramic-metal) composite material.

An electrolyte is formed at 260 by, for example, spray coating, dip coating or otherwise layering an electrolyte slurry (formed at 255) as a thin-layer onto at least a part of a surface of the sintered first electrode. The electrolyte may be formed onto a part of an inner surface or an outer surface of the sintered first electrode. The electrolyte slurry may be formed by combining the solid-oxide electrolyte substance with a solvent (such as discussed previously) and optionally one or more other additives (such as binders, dispersants, polymers, etc. as discussed previously) that are commonly used in ceramics manufacturing; mixing and milling; and then adding more solvent to form a slurry having a consistency to be coated or layered onto the first electrode. The electrolyte slurry typically has about 10% to about 30% volume of solid ingredients, with the remaining volume being solvent. The electrolyte is then dried and sintered at 270 to form a solid electrolyte layer.

A second electrode is formed at 280 by, for example, spray coating, dip coating or otherwise layering an electrode slurry (formed at 275) onto at least a part of a surface of the sintered electrolyte. The electrode slurry may be formed by combining the solid-oxide electrolyte substance, a second electrochemically active substance, and a carbon-based pore forming substance with a solvent (such as discussed previously) and optionally one or more other additives (such as binders, dispersants, polymers, etc. as discussed previously) that are commonly used in ceramics manufacturing; mixing and milling; and then adding more solvent to form a slurry having a consistency to be coated or layered onto the electrolyte. The electrode slurry typically has about 10% to about 30% volume of solid ingredients, with the remaining volume being solvent. The second electrode is then dried and sintered at 290, as discussed previously, to form a solid porous second electrode.

It should be understood that the operations described herein may be performed in any order, unless otherwise specified, and embodiments of the disclosure may include additional or fewer operations than those disclosed herein.

It will be further understood that the articles "a", "an", "the" and "said" are intended to mean that there may be one or more of the elements or steps present. The terms "comprising", "including" and "having" are intended to be inclusive and mean that there may be additional elements or steps other than those expressly listed.

The foregoing description has been presented for the purpose of illustrating certain aspects of the present disclosure and is not intended to limit the disclosure. Persons skilled in the relevant art will appreciate that many additions, modifications, variations and improvements may be implemented in light of the above teachings and still fall within the scope of the present disclosure.

We claim:

1. A process comprising:
   providing a tubular solid-oxide electrochemical cell comprising:
   a porous cathode configured in a tubular shape, the porous cathode comprising a first mixed ionically/electronically conductive composite material comprising a solid-oxide electrolyte substance having ionic conductivity and a first electrochemically active substance having electronic conductivity;
   an electrolyte disposed as a thin-layer on at least part of a surface of the porous cathode, the electrolyte comprising the solid-oxide electrolyte substance; and
   a porous anode disposed on at least part of a surface of the electrolyte, the porous anode comprising a second mixed ionically/electronically conductive composite material comprising the solid-oxide electrolyte substance and a second electrochemically active substance having electronic conductivity;
   connecting the porous cathode and the porous anode to a power source; and
   applying a voltage across the porous cathode and the porous anode to perform a catalytic electrochemical synthesis of ammonia.

2. The process of claim 1, wherein the solid-oxide electrolyte substance comprises a $H^+$ conducting material.

3. The process of claim 1, wherein the solid-oxide electrolyte substance comprises a material selected from the group consisting of a perovskite, a fluorite, a pyrochlore and a brownmillerite.

4. The process of claim 1, wherein the solid-oxide electrolyte substance comprises a perovskite having a general formula $ABO_3$,
   wherein A is selected from the group consisting of monovalent, divalent and trivalent metal cations and combinations thereof; and B is selected from the group consisting of pentavalent, tetravalent and trivalent metal cations and combinations thereof.

5. The process of claim 1, wherein the porous cathode comprises at least about 70% by weight of the solid-oxide electrolyte substance.

6. The process of claim 1, wherein the porous anode comprises at least about 70% by weight of the solid-oxide electrolyte substance.

7. The process of claim 1, wherein the first mixed ionically/electronically conductive composite material and the second mixed ionically/electronically conductive composite material are the same.

8. The process of claim 1, wherein the porous cathode has an average thickness in a range of about 5 mm to about 50 mm.

9. The process of claim 1, wherein the electrolyte has an average thickness in a range of about 5 microns to about 100 microns.

10. The process of claim 1, wherein the porous anode has an average thickness in a range of about 5 microns to about 100 microns.

11. The process of claim 1, wherein a thickness of the porous cathode is in a range of about 5 mm to about 50 mm, a thickness of the electrolyte is in a range of about 5 microns to about 100 microns, and a thickness of the porous anode is in a range of about 5 microns to about 100 microns.

12. The process of claim 1, wherein the first mixed ionically/electronically conductive composite material and the second mixed ionically/electronically conductive composite material each has a coefficient of thermal expansion within about 10% of that of the solid-oxide electrolyte substance.

13. The process of claim 1, wherein the tubular shape has an outer surface and an inner surface, and the electrolyte and the porous anode are formed on at least a portion of the outer surface.

14. The process of claim 1, wherein the tubular shape has an outer surface and an inner surface, and the electrolyte and the porous anode are formed on at least a portion of the inner surface.

* * * * *

UNITED STATES PATENT AND TRADEMARK OFFICE
CERTIFICATE OF CORRECTION

PATENT NO. : 11,021,799 B2  
APPLICATION NO. : 16/574570  
DATED : June 1, 2021  
INVENTOR(S) : Alvarez et al.

Page 1 of 1

It is certified that error appears in the above-identified patent and that said Letters Patent is hereby corrected as shown below:

On the Title Page

Item (73) The Assignee should read as follows:  
Low Emissions Resources Corporation  
New York, New York Signed and Sealed this  
Twenty-third Day of November, 2021

Drew Hirshfeld  
*Performing the Functions and Duties of the*  
*Under Secretary of Commerce for Intellectual Property and*  
*Director of the United States Patent and Trademark Office*